G. A. MEAD.
RAIL BOND.
APPLICATION FILED MAR. 20, 1906.
899,120.
Patented Sept. 22, 1908.
2 SHEETS—SHEET 2.
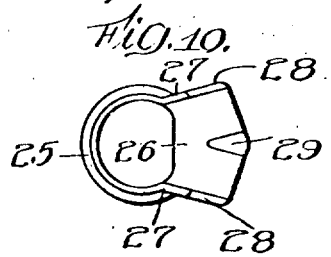
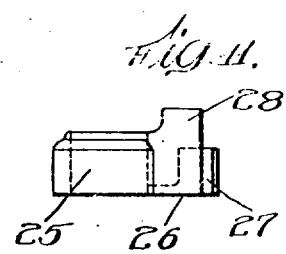
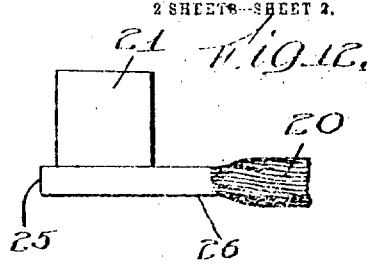
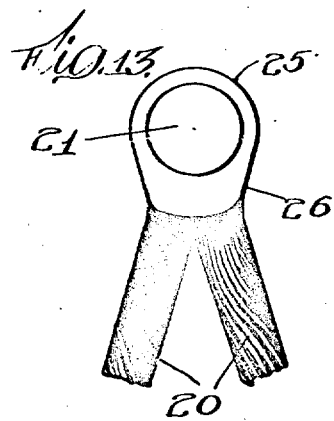
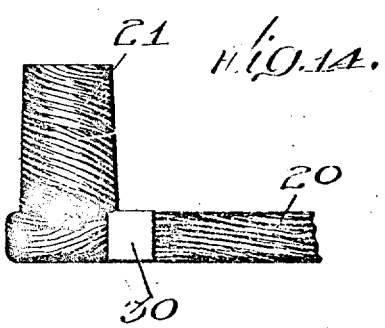
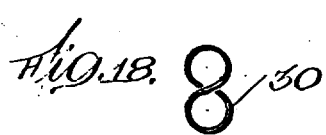
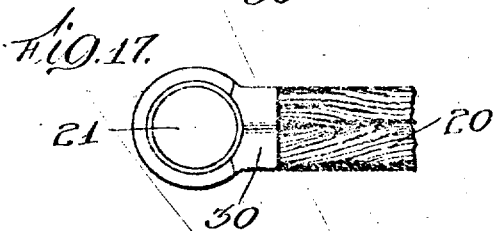
Witnesses:
G. V. Donarus
W. P. Kilroy
Inventor:
G. A. Mead
by Brown Darby & Hopkins
Attys

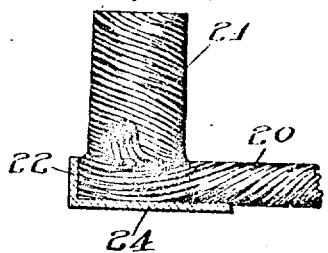
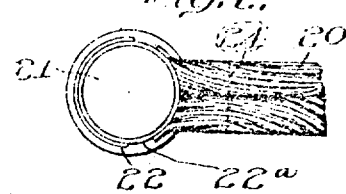
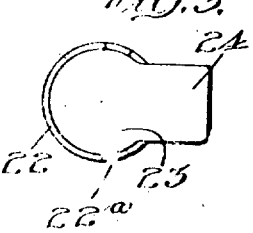
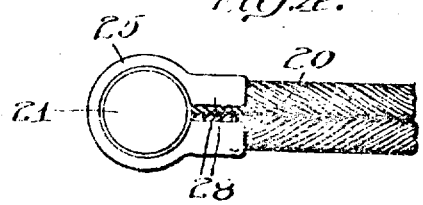
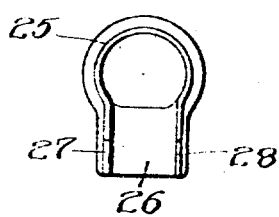
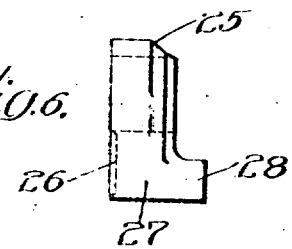
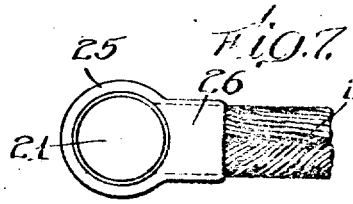
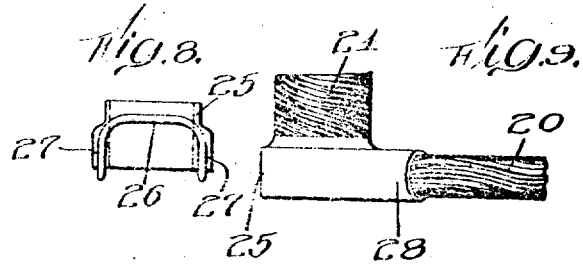

UNITED STATES PATENT OFFICE.

GEORGE ALVIN MEAD, OF MANSFIELD, OHIO.

RAIL-BOND.

No. 899,120.   Specification of Letters Patent.   Patented Sept. 22, 1908.

Application filed March 20, 1906. Serial No. 306,945.

*To all whom it may concern:*

Be it known that I, GEORGE A. MEAD, a citizen of the United States, residing at Mansfield, in the county of Richland and State of Ohio, have invented certain new and useful Improvements in Rail-Bonds, of which the following is a full, clear, and exact specification.

In the manufacture of rail bonds, or other electrical conductors, from stranded or laminated material, wherein the terminals are constructed from the same material and are integral with the body portion, it is necessary to subject the extremities of the material to a welding heat. These ends are then swaged or welded into the desired shape for proper application to the parts to be connected. It has been found that the intense heat necessary to permit the proper formation of the terminals tends to burn the strands, thereby tending to make them porous and brittle. To overcome this objectionable and very serious difficulty, is one of the primary objects of this invention.

A further object is to construct an improved bond of this character in which the body portion will be braced or strengthened at the junction with or the point at which the terminal is formed.

A further object is to provide an improved device of this character in which the head of the terminal will be protected from mechanical injury.

A further object is to construct an improved bond of this character comprising a stranded body portion having integral terminals, and in which the strands are prevented from movement with relation to the terminal at the point of their immediate junction therewith.

A further object is to provide an improved form of protector and strengthening device for bonds of this character, at the point at which the terminal is formed, and which protector is adapted to be applied and compressed into a homogeneous mass with the bond terminal during the process of welding or shaping of the terminal.

To the attainment of these ends and the accomplishment of other new and useful objects as will appear, the invention consists in the features of novelty in the construction, combination and arrangement of the several parts hereinafter more fully described and claimed, and shown in the accompanying drawings illustrating the embodiment of the invention, in which,—

Figure 1 is an elevation, partly in section, of a portion of the bond and one terminal constructed in accordance with the principles of this invention, and before being finally compressed or swaged; Fig. 2 is a top plan view of Fig. 1; Fig. 3 is a detail plan view of the form of protector shown in Fig. 1; Fig. 4 is a top plan view of a portion of the bond, with a modified form of protector applied thereto; Fig. 5 is a top plan view of the form shown in Fig. 4; Fig. 6 is a side elevation of Fig. 5; Fig. 7 is a top plan view of another modified form; Fig. 8 is an end elevation of Fig. 7; Fig. 9 is a view similar to Fig. 1, of a modified form; Fig. 10 is a detail top plan view of the protector shown in Fig. 9; Fig. 11 is a side elevation of Fig. 10; Fig. 12 is a side elevation of the form shown in Fig. 9, after having been compressed or swaged; Fig. 13 is a detail top plan view of Fig. 12; Fig. 14 is a side elevation of another modification; Fig. 15 is a top plan view of Fig. 14; Fig. 16 is a detail end elevation of the form shown in Figs. 14 and 15; Fig. 17 is a top plan view of still another modification; and Fig. 18 is an end elevation of the form shown in Fig. 17.

Referring more particularly to the drawings, 20 designates the body portion of the bond, preferably comprised of a plurality of strands of suitable material, such as copper or the like, the terminals of which are suitably welded into a homogeneous mass and bent to form terminals 21.

In Figs. 1, 2 and 3, the protector is shown in the form of a suitable cap, the wall 22 of which is provided with an opening, or is cut away, as at 23, and the top 24 thereof projects for some distance beyond the wall 22 adjacent to the opening 23 therein. If desired, additional spaces 22ª may be provided in the walls. This cap or protector is adapted to be applied to the end of the bond so that the top rests against the face of the bond, with the body portion projecting through the opening or cut-away portion 23, and with the wall 22 surrounding the base of the terminal 21; the width of the top being substantially equal to the width of the body of the bond.

In the forms shown in Figs. 4 to 13, the protector is in the form of a ring 25 provided with a laterally projecting flange 26, corresponding to the projecting portion of the top 24, as shown in Figs. 1 to 3. In the forms shown in Figs. 4 to 6, the flange 26 projects from the base of the ring 25 in a similar manner to the first form, but in this instance the projecting flange 26 is provided with upright side flanges or walls 27, which preferably project beyond the plane of the top of the ring 25, as at 28, for a purpose to be hereinafter set forth. A modified form of this exemplification of the invention is shown in Figs. 9, 10 and 11, wherein the sides of the projecting flange 26 diverge slightly, and projecting upwardly from the flange 26 is a boss or projection 29, which is located adjacent the free extremity of the said flange and at a point substantially midway of the side flanges 27, the side walls thereof being substantially parallel with the flanges 27. This form of protector is particularly adapted to be applied to bonds in which the body portion or cables 20 leading away from the terminals 21, are separated immediately at the point where they join the terminals, as more clearly shown in Fig. 13. In the form shown in Figs. 7 and 8, the flange 26 projects from the top of the ring, instead of from the bottom, and these side flanges 27 project downward, and preferably extend a short distance below the base of the ring, as seen in Fig. 8. In this exemplification of the invention, the ring 25 is first placed over the terminal 21, so that the flange 26 will rest upon the opposite face of the bond body, as will be understood.

In Figs. 14 to 18 is shown a still further modification of this invention, and in this instance the encircling ring for the head of the terminal is dispensed with, and there is employed a ferrule, thimble or sleeve 30, which may be of any suitable construction, and may be slipped upon the cables comprising the bond body, before the ends are welded, or may be a flat plate, which may be bent around the body of the bond at the point adjacent the terminal. This plate may be suitably shaped, if desired, to permit the same to partially surround the terminal 21, as shown in Figs. 15 and 16, and may be applied by wrapping or bending the same around the outside of the body, as shown in Figs. 15 and 16, or bent as shown in Figs. 17 and 18, so that the body portion thereof will pass between the cables forming the body portion 20, and into a substantially figure 8 shape, as seen in Fig. 18. In the forms of the invention shown in Figs. 1 to 13, the protector may be applied either before the ends of the strands of the body have been welded into a homogeneous mass, or after this operation and before final shaping or swaging. It is preferable, however, to apply the same just before the final shaping or swaging, as shown in Figs. 1 and 9.

In the forms where the projecting side flanges are provided, they may, if desired be bent down against the body of the bond before final heating. After heating, the terminals and the protector may be inserted into suitable dies or shapers and upset or swaged into the desired shape. During this swaging or final shaping of the terminal, the protector or auxiliary cap piece becomes incorporated into a homogeneous mass with the body and the terminal, thereby losing its identity (as shown in Figs. 12 and 13), and becoming an integral part of the bond and terminal, thus serving not only to protect the bond, or its strips, parts or strands, from scorching or burning and against mechanical injury, but also serving to stiffen and strengthen the parts at the points where they join.

The result obtained from the use of the forms shown in Figs. 14 to 18 is the same, except in this instance, the protector is located only at the point where the body and terminals join, and surrounds only the body portion. Thus, it will be seen that with such a construction, the effectiveness of the bond is greatly increased, as the terminal can not work loose from the body. The movement of one in relation to the other is prevented at the immediate junction of the terminal and the body portion, and is transferred to the end of the protector, where the wires are not at all injured.

It is to be understood that it is not desired to be limited to the exact construction and arrangement of the several parts, as numerous changes may be made therein without departing from the spirit of the invention.

What is claimed as new is,—

1. A rail bond comprising a body portion having integral terminals, and a separate protector secured to the bond at a point adjacent the terminals.

2. A rail bond comprising a stranded body having its ends formed into terminals, and a separate protector plate surrounding and secured to the body at the base of the terminal and projecting beyond the side thereof and in contact with one of the faces of the body.

3. A rail bond comprising a stranded body having its ends formed into terminals, and a separate protector plate surrounding and secured to the base of each of the terminals and provided with lateral projections engaging one face of the body, said projections being provided with flanges engaging the edges of the body.

4. A rail bond comprising a stranded body having its ends formed into terminals, a separate protector plate surrounding and secured to the base of the terminals, said protector being provided with a lateral projecting portion engaging one face of the body, and flanges extending from the edges of the projecting portion and engaging the sides of the body, and of a size to be bent into engagement with the opposite face of the body.

5. A rail bond consisting of a flexible body having its ends formed into solid terminals, and provided with a separate protecting sheath at the point where the flexible body merges into the solid terminal.

In testimony whereof I have signed my name to this specification, in the presence of two subscribing witnesses, on this 13th day of March A. D. 1906.

GEORGE ALVIN MEAD.

Witnesses:
H. S. BLOCK,
F. W. MILLER.